Oct. 10, 1967          D. SCARAMUCCI          3,346,008
                        BALL CHECK VALVE
Filed March 16, 1964                         2 Sheets-Sheet 1
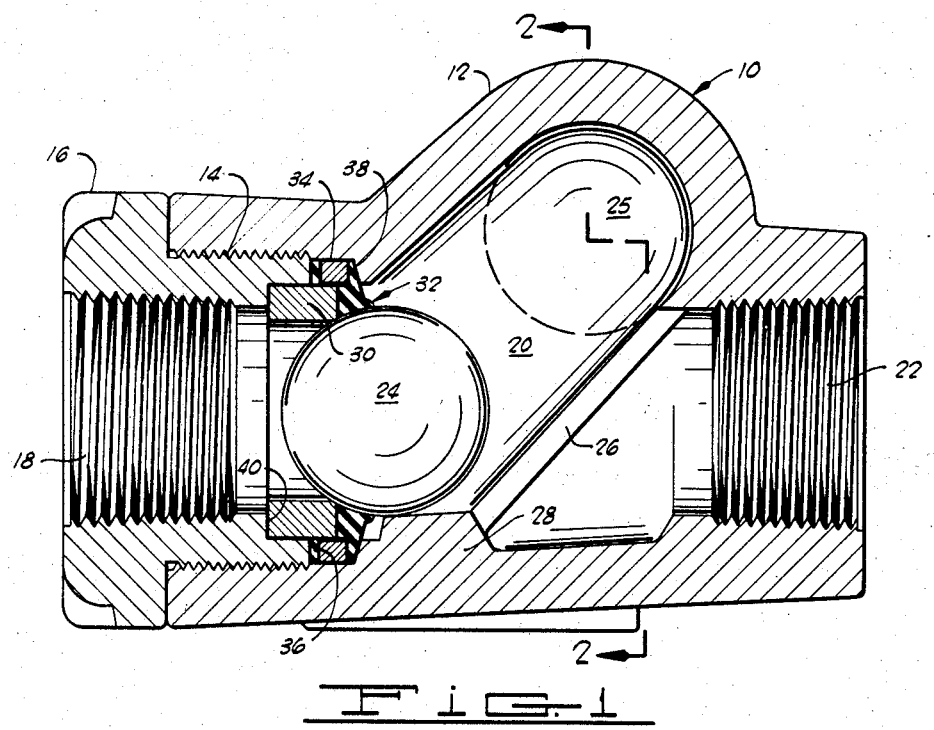
Fig. 1
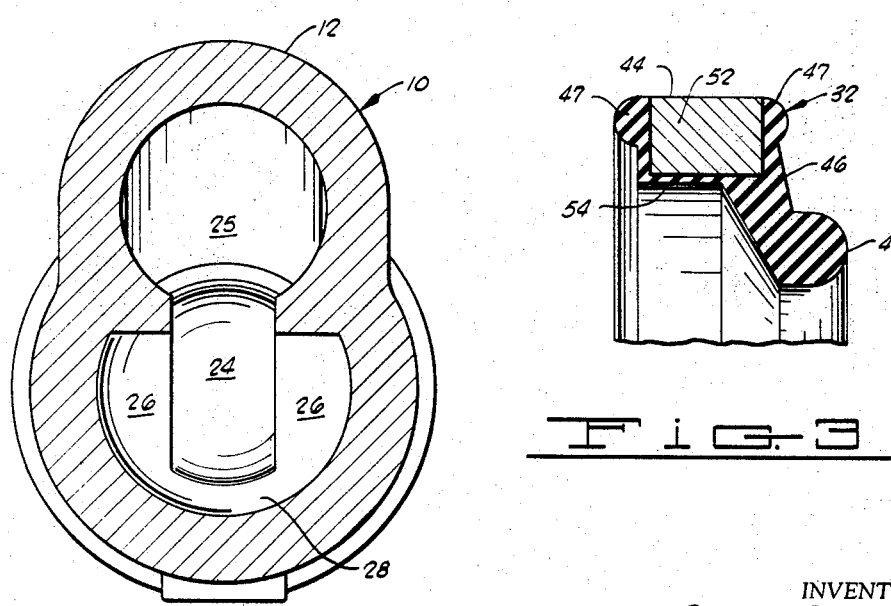
Fig. 2
Fig. 3
INVENTOR.
DOMER SCARAMUCCI
BY
Dunlap & Laney
ATTORNEYS Oct. 10, 1967   D. SCARAMUCCI   3,346,008
BALL CHECK VALVE Filed March 16, 1964   2 Sheets-Sheet 2

INVENTOR.
DOMER SCARAMUCCI
BY
Dunlap & Laney
ATTORNEYS

United States Patent Office 3,346,008
Patented Oct. 10, 1967

3,346,008
BALL CHECK VALVE
Domer Scaramucci, 3245 S. Hattie, Oklahoma City, Okla. 73129
Filed Mar. 16, 1964, Ser. No. 352,227
6 Claims. (Cl. 137—516.29)

This invention relates generally to improved valves useful in controlling flow in fluid systems. More particularly, but not by way of limitation, this invention relates to improved ball check valves useful in connection with fluid systems for preventing fluid flow in one direction while permitting flow in the opposite direction.

Check valves incorporating a spherical or ball operating member have proved themselves to be highly acceptable for use in fluid systems because of their long service life, even under errosive conditions. The long life of such valves is believed to be attributable, at least in part, to their inherent characteristic of presenting a different sealing surface each time the valve is closed. To present a different sealing surface each time the valve is closed, the ball operating member must be free to rotate in all planes within the valve.

In most service applications of check valves, it is highly desirable, if not mandatory, that a virtually instantaneous closure of the check valve occur upon a reversal of the fluid flow through the valve. A ball operating member, completely unrestrained, will offer the advantage of a different sealing surface each time the valve is closed, but may not consistently provide the desired instantaneous closure. Most, if not all, ball check valves constructed in the past have incorporated some means for guiding the ball operating member onto the valve seat in an attempt to attain the desired complete and instantaneous closure. Generally, such valves not only include a guiding mechanism for limiting the position of the ball valve when off the seat, but also include some form of guide immediately adjacent the seat to insure accurate alignment as the ball engages the seat.

Due to the desirability of providing an instantaneous, complete closure, the guiding means used in the past must be held to relatively close tolerances. As is well known, the cost of manufacture of a valve is dependent to a great extent upon the tolerances which must be held. The problem of holding close tolerances is further complicated in ball check valves because the seat is most often located in one part of the valve body while the ball guides are located in a separate part of the valve body. Generally, the two parts are assembled by engaging a pair of mating threads. In order to alleviate the tolerance problem, some valves have incorporated a seat which is arranged to move or rotate a limited amount to compensate for misalignment between the ball guides and the seat. However, the provision of the movable seat further complicates the valve in that an additional moving part is required which must in itself be held to relatively close tolerances. Also, the more complicated structure utilizing the movable seat, while perhaps reducing the tolerance requirements, will also increase the cost of the valve.

Check valves utilizing a metal valve ball which lands on a metal seat often have a limited service life due to deformation or "hammering out" of the valve seat after repeated valve operation. The failure of such valves generally occurs because the valve seal (normally a resilient member secured to the seat) cannot sealingly engage the valve ball in the position the ball occupies when retained by the "hammered out" seat. Under such circumstances instantaneous closure may be obtained; but, when the valve reaches the seat, fluid will leak between the seal and the ball.

A ball check valve constructed in accordance with this invention contemplates the provision of a seal having an outer peripheral portion retained in sealing engagement with a valve body, an inner peripheral portion adapted to sealingly engage a valve member, and a resilient connecting portion joining the peripheral portions. The connecting portion is constructed of a relatively thin resilient material and is adapted to permit relative movement between said peripheral portions, whereby the inner peripheral portion of the seal will sealingly engage the valve ball even though the valve ball and seal are not in alignment. Such an arrangement, when used in a ball check valve, reduces the accuracy to which the ball guides must be held, thereby reducing the cost and enhancing the performance of the check valve.

It is, therefore, one object of the invention to provide an improved check valve that will close effectively at low pressures and will remain closed at high pressures.

A further object of the invention is to provide an improved check valve incorporating a seal that compensates for misalignment between the valve member and seal.

Still another object of the invention is to provide an improved seal that permits relative movement between the sealing portions thereof to insure a fluid-tight seal.

A still further object of the invention is to provide an improved seal for use in the ball check valve that incorporates a relatively movable, pressure responsive seal portion to sealingly engage the valve ball.

One other object of the invention is to provide an improved check valve having a valve seat to restrain the movement of a valve member and a pressure responsive seal disposed in the valve that will sealingly engage the valve member during the entire useful life of the valve seat.

The foregoing and additional objects and advantages of the invention will become more apparent as the following description is read in conjunction with the accompanying drawings wherein like reference characters denote like parts in all views and wherein:

FIG. 1 is a longitudinal sectional view of a check valve constructed in accordance with the invention;

FIG. 2 is a cross-sectional view of the check valve of FIG. 1 taken along the line 2—2 of FIG. 1;

FIG. 3 is an enlarged cross-sectional view of a preferred form of a seal to be used in carrying out the invention;

Figure 4:
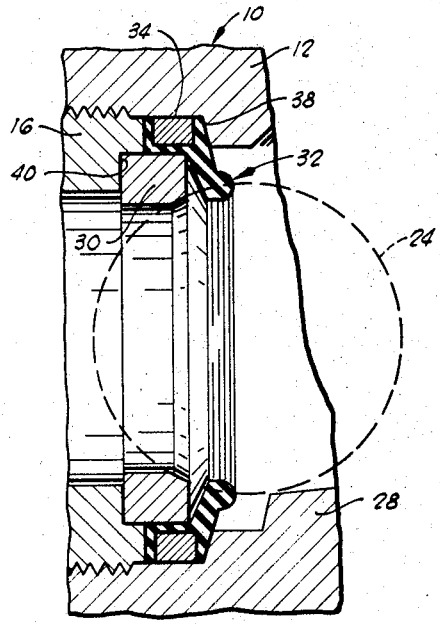
FIG. 4 is an enlarged cross-sectional view of a portion of the check valve in FIG. 1, illustrating the relative dimensions of the valve ball and seal.

Referring now to the drawings in detail, and to FIG. 1 in particular, shown therein is a check valve generally designated by the reference character 10. The check valve 10 includes a body portion 12 which has one end threaded as indicated at 14. A bushing 16 having external threads adapted to mate with the threads 14 is screwed into the valve body 12. With the bushing 16 screwed in the valve body 12, the bore 18 of the bushing forms the inlet to the valve 10. An enlarged ball receiving chamber 20 is formed in the valve body 12 in fluid communication with the inlet passageway 18 and in fluid communication with an outlet passageway 22 formed in the end of the body 12 opposite the threads 14. Both the inlet passageway 18 and the outlet passageway 22 are shown as having threads therein adapted to connect the check valve with portions of a fluid system (not shown). It should be understood that any suitable means, such as flanges, or sleeve-type fittings, may be provided to connect the valve 10 in such fluid system.

A ball valve 24 is positioned within the chamber 20 and is retained within certain limits by a pair of spaced-apart, parallel ball guides 26, which may be more clearly seen in FIG. 2. As shown, the guides 26 are formed on the opposite sides of the chamber 20 and extend at an angle to the horizontal to guide the ball 24 upwardly into a receiving pocket 25 at the upper end of the chamber 20 above the level of the inlet 18 and outlet 22 when the valve is open, as will be described. Also, a guide 28 projects from the body portion 12 into the lower portion of the chamber 20 and is provided to assist in guiding the valve ball 24 into proper alignment and engagement with a valve seat 30 and seal assembly 32.

The seal assembly 32 is positioned in an annular recess 34 formed in the valve body 12. The seal assembly 32 is retained in the valve body 12 between an end surface 36 of the bushing 16 and surface 38 of the annular recess 34. The valve seat 30 is positioned in an annular recess 40 which is formed in the interior of the bushing 16. The valve seat 30 is retained in the position illustrated due to its contact with the bushing 16 and by contact with the seal assembly 32. If desired, the valve seat 30 may be integrally formed with the end of the bushing 16. Generally, however, the seat 30 will be replaced during the life of the valve 10 and for this reason, the preferred form of the valve 10 has a separate seat 30.

FIG. 3 clearly illustrates the preferred form of the seal assembly 32 which may be utilized in the construction of the check valve 10. As shown therein, the seal assembly 32 includes a pressure responsive inner peripheral portion 42 which is illustrated as being bead-like in form and formed to project away from the seat 30. The seal assembly 32 also includes an outer peripheral portion 44 which is adapted to sealingly engage the valve body 12, the bushing 16, and the valve seat 30. A connecting portion 46 extends between the inner peripheral portion 42 to the outer peripheral portion 44. As illustrated, the connecting portion 46 is relatively thin as compared with the remaining portions of the seal assembly 32, and is adapted to permit relative movement to occur between the inner peripheral portion 42. The outer peripheral portion 44 is provided with a pair of annular, bead-like projections 47 extending outwardly in opposite directions to engage the face 36 of the bushing 16 and the surface 38 of the annular recess 34 in the valve body 12. The beads 47 are compressed upon assembly of the valve 10 and form a fluid-tight seal to prevent leakage from the interior of the valve 10 through the threads 14.

The outer peripheral portion 44 of the seal assembly 32 also includes an annular reinforcing ring 52 which is provided to aid in more positively retaining the seal assembly in the check valve 10. As illustrated, a thin portion of resilient material 54 extends between the connecting portion 46 and the projecting beads 47 to provide for a seal between the valve seat 30 and the seal assembly 32.

FIG. 4 illustrates the relative size of the inner peripheral portion 42 of the seal assembly 32 and the size of the valve ball 24, which is shown in dashed lines. As can be seen in FIG. 4, the inner diameter of the inner peripheral portion 42 is substantially less than the diameter of the valve ball 24 so that the initial sealing engagement of the inner peripheral portion 42 with the valve ball 24 occurs prior to the valve ball 24 coming into contact with the valve seat 30 (see FIG. 5). The importance of the relative sizes of the seal assembly 32 and the valve ball 24 will be explained more fully in connection with the operational description of the check valve 10.

Figure 5:
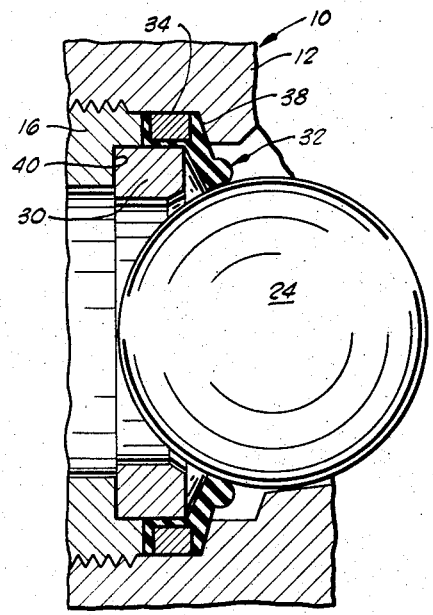
FIG. 5 is a view similar to FIG. 4, but showing a valve ball in initial sealing engagement with the seal.

When the check valve 10 is connected in a fluid system (not shown), fluid can flow through the inlet passageway 18, chamber 20 and thence through the outlet passageway 22. With fluid flowing in this direction, the valve ball 24 will move upwardly into the pocket 25 as indicated by the dash lines in FIG. 1. Should fluid cease flowing through the check valve 10, or should a reversal of flow occur, the valve ball 24 will gravitate downwardly along the guides 26 until the ball 24 comes into contact with the guide 28. Upon contacting the guide 28, the ball 24 is directed toward the seal assembly 32 and seat 30. Initial contact of the ball 24 with the inner peripheral portion 42 of the seal assembly 32 will form a fluid-tight seal therebetween as illustrated in FIG. 5.

It is important to note that in ball check valves constructed in the past the alignment between the ball guide and the seat and seal had to be held to very close tolerances so that initial contact between the valve ball and the seat would form a fluid-tight seal. In a valve constructed in accordance with this invention, however, should misalignment be present between the guide 28 and the seal assembly 32 and/or the valve seat 30, the valve ball 24 will, upon initial contact with the inner peripheral portion 42 of the seal assembly 32, deform the connecting portion 46 so that the inner peripheral portion 42 is moved to form a continuous line of contact about the ball 24 and thereby sealingly engage the ball 24.

As the differential pressure between the outlet passageway 22 and the inlet passageway 18 increases, the ball 24 will be driven toward the seat 30 until the ball 24 actually comes into contact with the seat 30. During the movement of the ball 24 toward the seat 30, the inner peripheral portion 42 of the seal assembly 32 maintains its fluid-tight engagement with the ball 24 due to the ability of the connecting portion 46 to flex. As the differential pressure continues to increase, the inner peripheral portion 42 and the connecting portion 46 of the seal assembly 32 are deformed as shown in FIGS. 1 and 5. As shown therein, the seal assembly 32 is trapped by the engagement of the ball 24 with the valve seat 30. Further increases in differential pressure will simply augment the fluid-tight seal due to the entrapment of the resilient portion of the seal assembly 32 as previously described.

Figure 6:
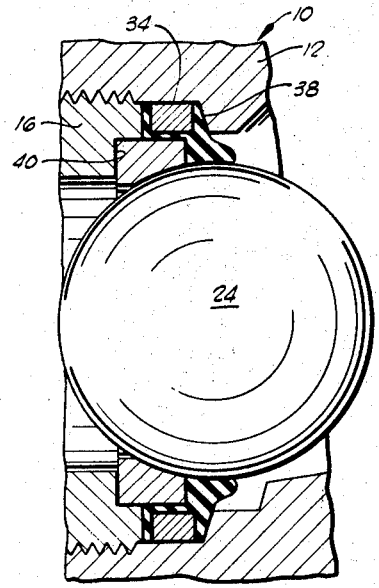
FIG. 6 is a view similar to FIG. 5, but showing the valve ball and seal in the position they occupy after the imposition of relatively high pressures thereon.

One other important aspect of the invention is afforded by the particular seal structure utilized. That feature is the ability of the seal assembly 32 to continue to maintain a complete closure even after the seat 30 has been hammered out by repeated operations of the ball 24. Due to the relative size of the inner peripheral portion 42 of the seal assembly 32, as compared with the outer diameter of the ball 24, it should be apparent that even though the seat is considerably hammered out, as shown in FIG. 6, a fluid-tight seal will be maintained. The seal assembly 32 is trapped, as previously described, so that it cannot move past the face of the seat 30. As the ball moves into contact with the seat 30, the inner peripheral portion 42 of the seal assembly 32 stretches to conform to the adjacent surface presented by the ball 24. Such surface is, upon initial contact, less than the overall diameter of the ball 24, but when the line of seal contact passes through the center of the ball 24, it will be equal to the overall diameter of the ball. Forcing the ball 24 into the seal assembly 32 after initial contact induces a hoop tension force in the seal assembly 32. The hoop tension force aids in maintaining the fluid-tight seal between the seal assembly 32 and the ball 24. It can be seen that the force will be present so long as the line of contact between the seal assembly 32 and the ball 24 has a diameter greater than the diameter of the inner peripheral portion 42. With the seat hammered out, the ball 24 will move toward the inlet or into the inlet passageway 18 so that the maximum diameter of the ball 24 may pass the inner peripheral portion 42 of the seal assembly 32, and yet a fluid-tight seal will still be maintained at all pressure ranges.

Figure 7:
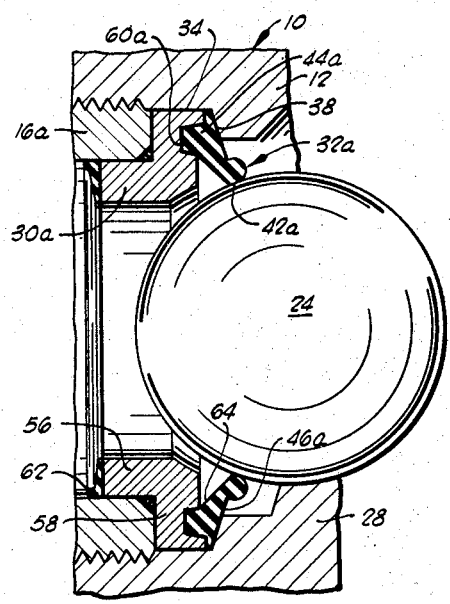
FIG. 7 is a view similar to FIG. 6, but showing an alternate construction of the valve seat and seal.

FIG. 7 illustrates a modified arrangement of a seal and seat structure that can be utilized in the ball check valve 10. A seal assembly 32a is permanently bonded to a valve seat 30a and the resulting combination is secured in the annular recess 34 in the valve body 12 by a threaded bushing 16a.

As illustrated in FIG. 7, the modified valve seat 30a comprises a generally tubular portion 56 having an annular flange 58 extending outwardly near one end thereof. The flange 58 has a circumferential groove 60 formed therein facing the valve chamber 20. A seal 62 is provided on the opposite end of the seat 30a and engages a slightly modified bushing 16a to prevent leakage between the bushing 16a and the seat 30a.

A modified seal assembly 32a includes a pressure responsive inner peripheral portion 42a and an outer peripheral portion 44a. A flexible connecting portion 46a extends between and connects the peripheral portions thereof. The inner peripheral portion 42a and the connecting portion 46a are substantially identical in structure and function to the corresponding portions 42 and 46, respectively, in the seal assembly 32. The outer peripheral portion 44a is arranged to conform to the adjacent flange 58 of the seat 30a and has an annular projection 64 extending into the circumferential groove 60 of the flange 58. The adjacent surfaces of the outer peripheral portion 44a and the seat 30a are permanently bonded. A seal is attained between the outer peripheral portion 44a and the shoulder 38 of the valve body 12 to prevent the leakage of fluid thereby.

The modified arrangement of the seat and seal shown in FIG. 7 will, when installed in a ball check valve 10, operate in the identical manner as previously described with respect to the seat 30 and seal assembly 32. The modification assures alignment between the seat 30a and seal assembly 32a, and provides for faster assembly since only the combined seat and seal is inserted in the valve body 12.

It should be apparent from the foregoing description that a check valve constructed in accordance with the invention can be easily and economically manufactured.

Also, it should be apparent that the check valve will have a longer service life due to the ability of the seal to maintain a fluid-tight closure in spite of the wear or hammering out of the valve seat. In addition, it can be appreciated that the seal structure disclosed herein will sealingly engage the ball or valve operating member despite a slight misalignment between the valve guide and the valve seal. Generally, the arrangement provided will permit the use of the valve body in an "as cast" condition.

It should be understood that the embodiments disclosed in detail herein are presented by way of example only and that many modifications and changes can be made thereto without departing from the spirit of the invention or from the scope of the annexed claims.

What I claim is:
1. A ball check valve comprising:
  a valve body having an inlet and an outlet passageway communicating with a ball receiving chamber located therein;
  valve seat means in said valve body encircling said inlet passageway;
  a valve ball located in said chamber and movable therein toward and away from said seat means; and,
  an annular seal mounted in said valve body having:
    an outer peripheral portion sealingly secured to said valve body in a fixed position,
    an inner peripheral portion in the ball receiving chamber spaced from said valve seat and sized to sealingly engage said valve ball prior to the engagement of said valve ball with said valve seat, and
    a resilient connecting portion extending between said peripheral portions, whereby said inner peripheral portion moves with said valve ball toward, and guides said valve ball onto said seat.

2. The ball check valve of claim 1 wherein:
  said valve body has an annular groove extending around the inlet passageway;
  said seat means extends partially over said annular groove; and,
  the outer peripheral portion of said seal is located in said annular groove and is retained therein by said valve body and seat.

3. The ball check valve of claim 1 wherein said sealing means also includes:
  an annular reinforcing member in said outer peripheral portion;
  a bead extending around the inner peripheral portion adapted to sealingly engage said valve ball; and,
  said seat means and valve ball cooperating to trap said seal, whereby pressure applied to said seal augments the seal formed between said seal and valve ball.

4. A ball check valve comprising:
  a valve body having an inlet and an outlet passageway communicating with a ball receiving chamber formed therein, said valve body having an annular groove encircling said inlet passageway;
  a bushing member disposed within said inlet passageway and having an annular recess formed in the inner wall thereof;
  a valve seat member disposed in said annular recess and extending partially over said annular groove;
  a valve ball located in said chamber and movable toward and away from said seat; and,
  a seal member including:
    an outer peripheral portion disposed in said annular groove and sealingly engaged by said bushing member and valve body.
    an annular reinforcing member in said outer peripheral portion,
    an inner peripheral portion of bead-like cross-section in the ball receiving chamber spaced from said seat and sized to sealingly engage said valve ball prior to the engagement of said valve ball with said seat, and
    a relatively thin connecting portion extending between said peripheral portions, whereby said inner peripheral portion moves with said valve ball toward, and guides said valve ball onto said seat.

5. A ball check valve comprising:
  a valve body having an inlet and an outlet passageway commuicating with a ball receiving chamber formed therein;
  a valve seat member having a radially extending exterior flange thereon;
  a bushing member disposed within said inlet passageway and engageable with said exterior flange on said seat member;
  a valve ball located in said chamber and movable toward and away from said valve seat; and,
  a seal member encircling said inlet passageway and including:
    a outer peripheral portion having a surface thereon bonded to said seat member and in sealing engagement with said valve body,
    an inner peripheral portion having a bead-like cross-section in the ball receiving chamber spaced from said seat and sized to sealingly engage said valve ball prior to the engagement of said valve ball with said seat, and
    a relatively thin connecting portion extending between said peripheral portions, whereby said inner peripheral portion moves with said valve ball toward, and guides said valve ball onto said seat.

6. A seal and seat combination comprising:
  a generally tubular seat member having an external flange extending radially therefrom, said flange being located on one end portion of said seat member; and, a seal member including:
   an outer peripheral portion bonded to said flange,
   a inner peripheral portion having a bead-like cross-section and spaced apart from said seat member, and
   a relatively thin connecting portion extending between said peripheral portions, whereby said inner peripheral portion can move relative to said outer peripheral portion.

References Cited

UNITED STATES PATENTS

| 2,673,062 | 3/1954 | Cornelius | 137—540 |
| 3,009,476 | 11/1961 | Usab | 251—332 |

FOREIGN PATENTS 192,758 11/1957 Austria.

WILLIAM F. O'DEA, *Primary Examiner.*

D. R. MATHEWS, *Assistant Examiner.*

UNITED STATES PATENT OFFICE
CERTIFICATE OF CORRECTION

Patent No. 3,346,008                                            October 10, 1967

Domer Scaramucci

It is hereby certified that error appears in the above numbered patent requiring correction and that the said Letters Patent should read as corrected below.

Column 3, line 45, after "42" insert -- and the outer peripheral portion 44 --.

Signed and sealed this 29th day of October 1968.

(SEAL)
Attest:

Edward M. Fletcher, Jr.                            EDWARD J. BRENNER
Attesting Officer                                       Commissioner of Patents